United States Patent [19]

Benko et al.

[11] Patent Number: 5,254,616
[45] Date of Patent: Oct. 19, 1993

[54] METAL OXIDE DEACTIVATION OF NATURAL RUBBER FATTY ACIDS

[75] Inventors: David A. Benko, Munroe Falls; Fredrick L. Magnus, Mogadore; Zalman Ronen, Akron, all of Ohio; Walter H. Waddell, Pittsburgh, Pa.; Robert W. Strozier, Houston, Tex.

[73] Assignee: The Goodyear Tire & Rubber Company, Akron, Ohio

[21] Appl. No.: 720,047

[22] Filed: Jun. 24, 1991

[51] Int. Cl.$^5$ ............................................. C08K 5/09
[52] U.S. Cl. .................... 524/394; 524/399; 524/400; 524/430; 524/433; 524/436; 524/437
[58] Field of Search ............... 524/394, 399, 400, 436, 524/437, 430, 433

[56] References Cited

U.S. PATENT DOCUMENTS

| | | | |
|---|---|---|---|
| 3,257,346 | 6/1966 | Gruver et al. | 260/23 |
| 3,517,722 | 6/1970 | Endter et al. | 252/359 |
| 3,738,948 | 6/1973 | Dunnom | 260/3 |
| 3,931,090 | 1/1976 | Amatangelo | 260/23.7 M |
| 3,933,732 | 1/1976 | Schmiegel | 260/42.27 |
| 4,130,519 | 12/1978 | Roper et al. | 260/23.7 H |
| 4,605,696 | 8/1986 | Benko et al. | 524/432 |
| 4,633,912 | 1/1987 | Pilkington et al. | 138/132 |
| 4,684,421 | 8/1987 | Tate | 156/124 |

OTHER PUBLICATIONS

Magnus et al, Role of Phenolic Tackifiers In Polyisoprene Rubber, ACS Rubber Division, Spring 1989 Meeting, Mexico City, Mexico, Paper No. 2.

"Blue Book 1986", D. R. Smith, Ed.; published by Rubber World magazine, a Lippincott and Peto publication, Akron, Ohio, 1986; pp. 66, 68, 69, 70, 72, 73, 79, 80, 81 and 88.

*Primary Examiner*—Paul R. Michl
*Assistant Examiner*—Edward Cain
*Attorney, Agent, or Firm*—Henry C. Young, Jr.

[57] ABSTRACT

Fatty acids commonly found in bulk elastomers such as natural rubber and certain synthetic polymers are deactivated by adding a metal oxide to the masterbatch stage where the metal oxide is selected from the group consisting of aluminum oxide, calcium oxide or mixtures thereof. Amounts range from about 0.1 phr to about 5 phr of calcium oxide, about 0.1 to about 7 phr of aluminum oxide, or about 0.5 to about 5 phr of aluminum oxide plus about 0.05 to 1 phr of calcium oxide. Deactivation of fatty acids improves tack and cure properties.

22 Claims, No Drawings

METAL OXIDE DEACTIVATION OF NATURAL RUBBER FATTY ACIDS

BACKGROUND OF THE INVENTION

Rubber compounding involves the use of a great variety of components which eventually result in a cured rubber article such as a tire. Typically, rubber compounds for the application are cured by a sulfur vulcanization process. This process has long been known to be influenced by the addition of numerous reagents. One class of reagents includes fatty acids commonly used in conjunction with metal oxides such as zinc oxide to improve sulfur vulcanization efficiency. However, the metal oxides and fatty acids are generally added in specific and determinable amounts.

Metal oxides and other metal salts and complexes have also been added to cause certain enhancements of particular rubber properties. U.S. Pat. No. 4,684,421 teaches the use of calcium borate in conjunction with a cobalt or nickel carboxylate to improve rubber to wire adhesion.

Rubber compounds for use in tires, belts and other types of rubber products, can contain a wide variety of different types of ingredients combined to form a final cured product. The final product is generally a highly crosslinked, highly filled rubber or rubber composite. Commonly, these rubber compounds are formulated by mixing together under masticating conditions ingredients including, but not restricted to, extender oils, bulk elastomers, fillers, antidegradants, curatives, cure activators, waxes and plasticizers. The final products are then generally cured thermally to yield a given product such as a tire, belt, hose or any other product containing cured rubber.

Certain ingredients can significantly affect vulcanization and ultimately final rubber product properties. These ingredients can also affect other properties such as tack (rubber to rubber or rubber to other ingredient adhesion) and product uniformity. Fatty acids are one such ingredient. Fatty acids may be present in the bulk elastomer prior to compounding. Fatty acids are also typically added to elastomers during compounding to augment cure behavior and to increase the state of cure. It is believed that fatty acids increase the solubility of zinc oxide allowing a greater amount of zinc salt to participate in sulfur vulcanization.

Although fatty acids are routinely added to elastomers during compounding to achieve improved vulcanizates, excess fatty acid content can cause a decrease in tack. Tack is related to the ability of uncured rubber compounds to adhere to components including itself (autohesion) and other rubber compounds. Tack is therefore vital to any type of building process involving rubber composites or mixed composites containing rubber, fiber, fabric, metals or other ingredients. It is thought that fatty acids bloom to the surface of a rubber compound after mixing (migrate to the surface of a rubber component) which causes an increase in fatty acid content near or at the surface of the compounded rubber. This build up of fatty acid at or near the surface of a rubber is thought to significantly and measurably reduce tack.

Bulk elastomers, which have either naturally occurring fatty acids or fatty acids added during manufacture, usually have amounts of fatty acids which are difficult to determine. The presence of an indeterminate amount of fatty acids in a bulk elastomer makes strict control of vulcanization difficult. This lack of strict control can affect final product uniformity as well as final product properties. Analysis of fatty acid content by classical methods, e.g., extraction and chromatography of the extract, is too cumbersome for plant use.

In order to make uniform rubber products and have tight controls on vulcanization utilizing elastomers that have variable or indeterminate amounts of fatty acids, a method for deactivating the fatty acids present in bulk elastomers is desirable.

SUMMARY OF THE INVENTION

This application relates to the deactivation of fatty acids commonly found in bulk elastomers such as natural rubber and certain synthetic elastomers which have had fatty acids added to them during manufacturing. More particularly, this application relates to the use of aluminum oxide, calcium oxide and/or mixtures thereof, as a technique for deactivating fatty acids found in certain bulk elastomers.

Typically, natural rubber and certain synthetic elastomers have undetermined amounts of fatty acids present in their original state as a bulk elastomer. The present invention provides a method for deactivating these fatty acids by complexing them with a metal oxide thereby rendering them inactive in causing deleterious effects on mixed rubber composition properties such as tack, cure rate, state of cure and cure time.

The compositions of the present invention comprise at least one elastomer having present sufficient fatty acids to affect tack and cure physical properties treated with a fatty acid deactivating metal oxide.

The invention is also directed to a masterbatch rubber formulation containing some fatty acid deactivated elastomer and to a vulcanizable rubber formulation containing either some fatty acid deactivated elastomer or fatty acid deactivated masterbatch.

The masterbatch comprises at least one fatty acid deactivated elastomer where the elastomers make up 100 phr, from about 10 to 200 phr (part by weight per 100 of rubber) of a filler or mixture of fillers, from about 0 to 100 phr of an oil or a mixture of oils, from about 0 to about 10 phr of an antidegradant package, from about 0 to 10 phr of one compound of an resorcinol-formaldehyde (RF) system from about 0 to about 10 phr of zinc oxide, and a fatty acid deactivating amount of calcium oxide, aluminum oxide or a mixture thereof.

The vulcanizable rubber formulation comprises a fatty acid deactivated masterbatch, a sulfur vulcanization package and an antidegradant package.

A vulcanizable rubber formulation according to this invention may have the following composition: 100 phr of at least one elastomer having present a sufficient amount of fatty acid to affect tack and cure physical properties, a sulfur vulcanization package, from about 10 to 200 phr of a filler or mixture of fillers, from 0 to 100 phr of an oil or a mixture of oils, from 0 to about 10 phr of an antidegrandant package, from 0 to 10 phr of an in situ methylene donor-methylene acceptor resin system and from 0 to about 10 phr of zinc oxide, said fatty acid deactivated elastomer further comprising a fatty acid deactivating metal oxide or mixture thereof, said metal oxide or mixture thereof being selected from the group consisting of aluminum oxide, calcium oxide or a mixture thereof, the amount of fatty acid deactivating metal oxide or mixture thereof being sufficient to deactivate said fatty acid.

The method of the present invention for deactivating fatty acids present in bulk elastomers involves contacting the bulk elastomer having present sufficient fatty acids to affect tack and cure physical properties, in a non-productive mix stage or masterbatch mix stage, where these two terms are used interchangeably hereunder, with a metal oxide in a masticating environment in order to affect a chemical and/or physical reaction or interaction between the fatty acids present in the bulk elastomer and the metal oxide. This inhibits or prevents fatty acid bloom, increases tack and improves product uniformity.

The method of the present invention can be performed during gum rubber coagulation and dewatering, during initial rubber breakdown, a common procedure to reduce the molecular weight distribution of natural rubber, during the non-productive mix stage or during any operation which will allow the bulk elastomer to come into intimate contact with the fatty acid deactivating metal oxides. The method can be performed in an internal mixer, mill, an extruder or like equipment used in the rubber industry for preparation and use of bulk elastomers.

The metal oxides found to be useful in this method for the deactivation of fatty acids found in bulk elastomers are selected from the representative and illustrative group consisting of aluminum oxides, calcium oxides and mixtures thereof.

Although both aluminum oxide and calcium oxide deactivate fatty acid, aluminum oxide can be used in higher amounts than calcium oxide.

DETAILED DESCRIPTION OF THE INVENTION

Applicants have found that the addition of certain metal oxides to a bulk elastomer containing a variable or indeterminate amount of fatty acids, sufficient to affect tack and final physical properties such as natural rubber or synthetically derived bulk elastomers containing fatty acids added during manufacture, results in a significant reduction of fatty acid bloom, a significant increase in building tack and improved product uniformity. In fact, the amount of fatty acid measurable at or near the surface of the rubber compound can be reduced to essentially zero by addition of these metal oxides.

Applicants have found that aluminum oxide, calcium oxide or mixtures thereof are efficient in the deactivation of fatty acids present in bulk elastomers. Further, applicants have found that larger amounts of aluminum oxide can be added to the non-productive mix stages of a rubber formula than calcium oxide to accomplish an equivalent fatty acid deactivation.

Fatty acid deactivation can be accomplished by the addition of metal oxides selected from the representative and illustrative group consisting of aluminum oxide, calcium oxide, or mixtures thereof. The efficiency of aluminum oxide, calcium oxide and mixtures thereof do differ. Aluminum oxide can be used at a higher part level than calcium oxide without adversely affecting final cure properties.

In the case of aluminum oxide, aluminum oxide can be added in a range from about 0.1 to about 7 phr, based on the amount of bulk elastomer containing a variable or indeterminate amount of fatty acid used. From about 2 to about 7 phr of aluminum oxide is preferred, with from about 3 to about 5 phr of aluminum oxide being particularly preferred. Basic aluminum oxide is preferred over other aluminum oxides.

In the case of calcium oxide, the range that has been found to be effective is from about 0.1 to about 5 phr, with from about 0.1 to about 2 phr being preferred. In the case of a mixture of aluminum and calcium oxides from about 0.5 to about 5 phr of an aluminum oxide and from about 0.05 to about 1 phr of calcium oxide are sufficient to deactivate the fatty acids in bulk elastomers containing a variable or indeterminate amount of fatty acid. Preferably, the mixture is from about 1 to about 5 phr of aluminum oxide and from about 0.1 to about 1 phr of calcium oxide.

Whether aluminum oxide, calcium oxide or a mixture thereof is used, the amount of metal oxide or mixture thereof used is sufficient to deactivate the variable or indeterminate amount of fatty acids present in the bulk elastomer. The amount of calcium oxide, aluminum oxide or mixture thereof added is also in excess of the quantity equivalent to any fatty acid added as a compounding ingredient. (The term, "quantity equivalent", refers to the stoichiometric quantity required to form a fatty acid soap, e.g., 0.5 mole of calcium oxide per mole of monobasic fatty acid such as stearic acid. Addition of a fatty acid as a compounding ingredient is optional).

Sufficiency of the amount of added calcium oxide, aluminum oxide or mixture thereof can be determined by Fourier Transform Infrared (FT-IR) surface analysis and tack analysis of the uncured stock.

A good indication of fatty acid content is obtainable by Fourier Transform Infrared (FT-IR) surface analysis of the uncured elastomer stock. Fatty acid and/or fatty acid calcium or aluminum salt contents are low when sufficient CaO and/or $Al_2O_3$ has been added. Tack of the uncured stock is also improved by addition of sufficient CaO and/or $Al_2O_3$. Suitable FT-IR surface analysis and tack determination techniques are described in Magnus, F.L. and Hamed, G.R., *Role of Phenolic Tackifiers in Polyisoprene Rubber*, ACS Rubber Division, Spring 1989 Meeting, Mexico City, Mexico, Paper No. 2. FT-IR analysis and tack determination will be further explained in the Examples.

The present invention is directed toward deactivating fatty acids found in bulk elastomers containing variable or indeterminate amount of fatty acids. These bulk elastomers encompass in general a wide variety of a diene containing polymer. However, the invention is not targeted to all diene containing polymers. It is primarily directed toward those diene containing polymers which prior to compounding (i.e., as a bulk elastomer) contain variable or indeterminate amounts of fatty acids. The principal bulk elastomer which contain variable or indeterminate amounts of fatty acids are natural rubbers.

Although this invention is targeted to bulk elastomers containing variable or indeterminate amount of fatty acids, the invention also spans rubber formulations which contain mixtures of diene containing polymers containing variable indeterminate amounts of fatty acids.

The term "diene containing polymer" includes conventional rubbers or elastomers such as natural rubber and all its various raw and reclaimed forms as well as various synthetic unsaturated or partially unsaturated rubbers, i.e., rubber polymers of the type which may be vulcanized with sulfur. Representative of synthetic polymers are the homopolymerization products of butadiene and its homologues and derivatives. For example, methylbutadiene, dimethylbutadiene and pentadiene may be used, as well as copolymers such as those formed from a butadiene or its homologues or derivatives with other unsaturated organic compounds. Among the latter are olefins, for example, ethylene, propylene or isobutylene which copolymerizes with isoprene to form polyisobutylene also known as butyl rubber; vinyl compounds, for example, vinyl chloride, acrylic acid, acrylonitrile (which polymerizes with butadiene to from NBR), methacrylonitrile, methacrylic acid, alpha-methylstyrene and styrene, the latter compound polymerizing with butadiene to form SBR, as well as vinyl esters and various unsaturated aldehydes, ketones and ethers, e.g. acrolein and vinyl ethyl ether. Also included are the various synthetic rubbers prepared from the homopolymerization of isoprene and the copolymerization of isoprene with other diolefins and various unsaturated organic compounds. Also included are the synthetic rubbers such as cis-1,4-polybutadiene and cis-1,4-polyisoprene and similar synthetic rubbers which have been developed in recent years, such as EPDM.

Such recently developed rubbers include those that have polymer bound functionalities such as antioxidants and antiozonants. These polymer bound materials are known in the art and can have functionalities that provide antidegradative properties, synergism and other properties.

The preferred diene containing polymers for use in the present invention include natural rubber, polybutadiene, synthetic polyisoprene, styrene/butadiene copolymers, isoprene/butadiene, NBR, terpolymers of acrylonitrile, butadiene and styrene and blends thereof.

A rubber composition of the present invention may also contain in situ generated methylene donor-methylene acceptor (e.g., resorcinol-formaldehyde) resin (in the vulcanized rubber/textile matrix) by compounding a vulcanizing rubber stock composition with the phenol/formaldehyde condensation product (hereinafter referred to as the "in situ method"). The components of the condensation product consist of a methylene acceptor and a methylene donor. The most common methylene donors include N-(substituted oxymethyl) melamine, hexamethylenetetramine and hexamethoxymethylmelamine. A common methylene acceptor is a dihydroxybenzene compound such as resorcinol or resorcinol ester. A resorcinol-formaldehyde resin of this type is known to promote adhesion to reinforcing cords (e.g., brass coated steel or polyester) and is more fully described in U.S. Pat. Nos. 3,517,722 and 4,605,696.

The vulcanizable rubber composition of the present invention contains a sulfur vulcanizing agent or mixture thereof. Examples of suitable sulfur vulcanizing agents include elemental sulfur and sulfur donating vulcanizing agents, for example, an amine disulfide, a polymeric polysulfide or a sulfur olefin adduct.

The amount of sulfur vulcanizing agent or mixture thereof will vary depending on the type of rubber and the particular type of sulfur vulcanizing agent that is used. Generally speaking, the amount of sulfur vulcanizing agent ranges from about 0.1 to about 10 phr with the range of from about 0.5 to about 7 being preferred.

In addition to the above, other rubber additives may be incorporated in the sulfur vulcanizable material. The additives commonly used in rubber vulcanizates are, for example, carbon black, silica, tackifier resins, processing aids, antioxidants, antiozonants, stearic acid, activators, waxes, oils and peptizing agents. As known to those skilled in the art, depending on the intended use of the sulfur vulcanizable material, certain additives mentioned above are commonly used in conventional amounts. A person of ordinary skill should recognize that one can add additional components to the formulation such as, but not limited to: tackifier resins from about 0 phr to about 20 phr; processing aids from about 1 phr to about 10 phr; antioxidants from about 1 phr to about 10 phr; antiozonants from about 1 phr to about 10 phr; stearic acid from about 0.1 phr to about 4 phr; zinc oxide from about 2 phr to 10 phr; waxes from about 1 phr to 5 phr; oils from about 5 phr to 30 phr; peptizers from about 0.1 phr to 1 phr; silica from about 5 phr to about 25 phr; and retarder from 0.05 phr to 1.0 phr. The presence and relative amounts of the above additives are not an aspect of the present invention and can be added at any desired level for a particular application.

Accelerators may be used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 phr to about 2.0 phr. Combinations of two or more accelerators may also be used at appropriate levels to accelerate vulcanization. Such combinations are known to be synergistic under appropriate conditions and one of ordinary skill in the art would recognize when their use would be advantageous and at what levels.

Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

Conventional rubber compounding techniques can be used to form compositions according to this invention. For example, rubber and desired additives (typically all except the accelerators and optionally zinc oxide) can be mixed together in a first mixing stage to form a masterbatch, and the accelerator(s) and zinc oxide (if not added previously) can be added in a second mixing stage to form a production mix, which is formed into the desired uncured rubber article or tire component.

Vulcanization of the rubbers containing the fatty acid deactivating metal oxides of the present invention may be conducted at conventional temperatures used for vulcanizable materials. For example, temperatures may range from about 100° C. to 200° C. Preferably, the vulcanization is conducted at temperatures ranging from about 110° C. to 180° C. Any of the usual vulcanization processes may be used, such as heating in a press mold, heating with superheated steam or hot air or in a salt bath.

The objects and aspects of this invention are further described by the following illustrative examples. The following abbreviations will be systematically used in the examples:

phr—parts by weight per hundred parts of rubber
RH—relative humidity
NR—natural rubber
ACC—primary and/or secondary accelerators
S—sulfur
AO—antidegradants
WAX—waxes
OIL—extender oil
RT—retarders
TR—tackifiers CB—carbon black
SI—silica
ZNO—zinc oxide
ALO—aluminum oxide
CAO—calcium oxide
RF1—methylene acceptor (resorcinol)
RF2—methylene donor
FA—fatty acid
NP—non-productive mix
NP1—first stage non-productive mix
NP2—second stage non-productive mix
P—production mix
ML—minimum rheometer torque
ts1—time to one point rise in torque
tc25—time to 25% cure
tc90—time to 90% cure
ΔT—maximum minus minimum rheometer torque
Rate—rate of vulcanization

EXAMPLE 1

This example illustrates the effect CAO has on the tack and cure properties of a set of compound formulations using natural rubber as the bulk elastomer containing an undetermined quantity of fatty acids where all component levels are in phr. p The formulations were mixed in a standard laboratory internal mixer. The compound formulations per mix were as follows:

| Component(phr) | 1 | 2 | 3 |
|---|---|---|---|
| NP1 | | | |
| NR | 100 | 100 | 100 |
| CAO | 0 | 1 | 5 |
| NP2 | | | |
| NP1 | 100 | 100 | 105 |
| CB | 45 | 45 | 45 |
| OIL | 12 | 12 | 12 |
| RF1 | 0.55 | 0.55 | 0.55 |
| P | | | |
| NP2 | 157.55 | 158.55 | 162.55 |
| S | 2.5 | 2.5 | 2.5 |
| ACC | 1.25 | 1.25 | 1.25 |
| RF1 | 0.45 | 0.45 | 0.45 |

Run 1 was a control used to compare the results in the absence and presence of calcium oxide. After the formulations were mixed, tack testing, Fourier Transform Infrared (FT-IR) surface analyses and cure properties were determined for each formulation as shown in the following tables:

TABLE 1

| | TACK VALUES (N/CM)(a) | |
|---|---|---|
| Run # | Original | 1 Day(b) |
| 1 | 29.1 ± 1.9 | 3.03 ± 0.12 |
| 2 | 28.5 ± 3.0 | 6.08 ± 0.67 |
| 3 | 31.0 ± 7.1 | 9.79 ± 1.66 |

(a)Tack testing was performed as taught in Magnus, F.L. and Hamed, G.R., Role of Phenolic Tackifiers in Polyisoprene Rubber, ACS Rubber Division, Spring 1989 Meeting, Mexico City, Paper No. 2.
(b)The aging conditions where 90% RH/30° C.

TABLE 2

| | RHEOMETER CURE PROPERTIES AT 150° C. | | | |
|---|---|---|---|---|
| Run # | ML (dN-m) | ts1 (min) | tc90 (min) | ΔT (dN-m) |
| 1 | 7.5 | 1.9 | 6.3 | 29.6 |
| 2 | 9.4 | 1.7 | 8.7 | 24.3 |
| 3 | 10.0 | 1.7 | 4.0 | 19.2 |

The tack data indicated that original autohesion was moderately affected by the addition of CAO. However, the aged tack values were significantly improved with CAO as the CAO level increased (Table 1).

In addition, FT-IR surface analysis was performed and indicated that compounds which contained CAO had virtually no fatty acid salt on or in the near surface region of the compounds.

The rheometer data showed that the CAO reduced the state of cure (delta torque). This suggest that the fatty acid activity was reduced since the function of the acid is to enhance the cure state (Table 5).

EXAMPLE 2

This example illustrates the effect that ALO has on tack values, surface composition and cure properties of a set of compound formulations involving two non-productive mix stages and one production mix stage, where all component levels are in phr. The bulk elastomer is natural rubber containing an undetermined quantity of fatty acids.

The compounds were mixed in a standard lab scale internal mixer. The compound formulations per mix were as follows:

| Component (phr) | 1 | 2 | 3 | 4 | 5 | 6 |
|---|---|---|---|---|---|---|
| NP1 | | | | | | |
| NR | 100 | 100 | 100 | 100 | 100 | 100 |
| ALO | 0 | 0 | 3 | 5 | 3 | 5 |
| NP2 | | | | | | |
| NP1 | 100 | 100 | 103 | 105 | 103 | 105 |
| CB | 37 | 37 | 37 | 37 | 37 | 37 |
| SI | 10 | 10 | 10 | 10 | 10 | 10 |
| WAX | 2 | 2 | 2 | 2 | 2 | 2 |
| RF1 | 3 | 3 | 3 | 3 | 3 | 3 |
| ZNO | 5 | 5 | 5 | 5 | 5 | 5 |
| FA | 0.5 | 0 | 0 | 0 | 0 | 0 |
| TR | 5.5 | 5 | 5 | 5 | 0 | 0 |
| OIL | 1 | 2 | 2 | 2 | 7 | 7 |
| P | | | | | | |
| NP2 | 164 | 164 | 167 | 169 | 167 | 169 |
| RF2 | 3 | 3 | 3 | 3 | 3 | 3 |
| AO | 1 | 1 | 1 | 1 | 1 | 1 |
| RT | 0.2 | 0.2 | 0.2 | 0.2 | 0.2 | 0.2 |
| ZNO | 3 | 3 | 3 | 3 | 3 | 3 |
| ACC | 1.1 | 1.1 | 1.1 | 1.1 | 1.1 | 1.1 |
| S | 2.9 | 2.9 | 2.9 | 2.9 | 2.9 | 2.9 |

Runs 1 and 2 are two different controls which differ primarily in FA, TR and OIL levels. These controls were included as comparison runs for analyzing the usefulness of aluminum oxide as a fatty acid deactivator. After the formulations were mixed, each formulation was the subject of a series of tests to determine tack, cure properties and surface properties. The values obtained from these tests are shown in the following tables:

TABLE 3

| | TACK VALUES (N/CM)(a) | | |
|---|---|---|---|
| Run # | Original | 1 Day(b) | 7 Days(c) |
| 1 | 16.2 ± 6.8 | 0.89 ± 0.65 | 5.12 ± 0.84 |
| 2 | 16.9 ± 4.1 | 2.66 ± 0.50 | 4.89 ± 0.43 |
| 3 | 17.5 ± 12.9 | 2.11 ± 0.32 | 5.50 ± 0.20 |
| 4 | 20.0 ± 7.9 | 2.16 ± 0.24 | 4.78 ± 0.49 |
| 5 | 22.0 ± 7.3 | 3.12 ± 0.31 | 3.79 ± 0.32 |

TABLE 3-continued

| Run # | TACK VALUES (N/CM)(a) | | |
|---|---|---|---|
| | Original | 1 Day(b) | 7 Days(c) |
| 6 | 21.5 ± 5.5 | 3.80 ± 1.06 | 3.31 ± 1.48 |

(a)Tack testing was performed as taught in Magnus, F.L. and Hamed, G.R., Role of Phenolic Tackifiers in Polyisoprene Rubber, ACS Rubber Division, Spring 1989 Meeting, Mexico City, Paper No. 2.
(b)90% RH at 30° C.
(c)60% RH at 22° C.

TABLE 4

| SIZE OF FT-IR PEAKS IN 1540-1560 CM-1 RANGE* | | |
|---|---|---|
| Run # | 1 Day(a) | 7 Days(b) |
| 1 | 19.8 | 3.3 (1545) |
| 2 | 10.6 | 2.4 (1550) |
| 3 | 18.0 | 3.2 (1550) |
| 4 | 10.7 | 2.8 (1548) |
| 5 | 7.0 | 3.4 (1553) |
| 6 | 8.8 | 2.5 (1547) |

*Number in parenthesis is the peak wave number. If no wave number is listed, the peak is at 1540 cm-1 which represents fatty acid salt. FT-IR spectra were obtained using an attenuated total reflectance technique for measuring relative surface components as taught in Magnus, F.L. and Hamed, G.R., Role of Phenolic Tackifiers in Polyisoprene Rubber, ACS Rubber Division, Spring 1989 Meeting, Mexico City, Paper No. 2. The values stated are the relative peak size in absorbance units per cited reference.
(a)90% RH at 30° C.
(b)60% RH at 22° C.

TABLE 5

| | RHEOMETER CURE PROPERTIES @ 150° C. | | | | | |
|---|---|---|---|---|---|---|
| Run # | ML (dN-m) | ts1 (min) | tc25 (min) | tc90 (min) | ΔT (dN-m) | Rate (dN-m/min) |
| 1 | 8.2 | 4.2 | 9.8 | 23.0 | 31.3 | 1.54 |
| 2 | 8.7 | 4.1 | 10.6 | 28.7 | 27.4 | 0.99 |
| 3 | 8.6 | 4.2 | 10.5 | 28.4 | 27.7 | 1.02 |
| 4 | 8.2 | 4.2 | 10.6 | 28.9 | 27.9 | 1.00 |
| 5 | 9.4 | 5.0 | 14.7 | 28.2 | 29.0 | 1.40 |
| 6 | 9.1 | 5.3 | 14.9 | 28.8 | 28.8 | 1.37 |

From the tack values given in Table 3, it can be seen that ALO marginally improves the original tack and significantly improves the one day at 90% RH at 30° C. tack values and shows similar seven day aged tack values. It can also be seen that seven day aged tack values are higher for compounds 1–4, all of which have added TR (tackifiers). Table 4 shows some changes in one day FT-IR values but no apparent trend is evident. The addition of ALO has little if any effect on cure properties.

EXAMPLE 3

This example illustrates the effect that aluminum oxide has on tack values, surface properties and cure properties of a set of compound formulations involving two non-productive mix stages and one production mix stage where all component levels are in phr.

The compounds were mixed in a standard lab scale internal mixer. The compound formulations per mix were as follows:

| Component (phr) | 1 | 2 | 3 | 4 | 5 | 6 |
|---|---|---|---|---|---|---|
| | | | NP1 | | | |
| NR | 100 | 100 | 100 | 100 | 100 | 100 |
| ALO | 0 | 0 | 3 | 5 | 3 | 5 |
| | | | NP2 | | | |
| NPI | 100 | 100 | 103 | 105 | 103 | 105 |
| CB | 37 | 37 | 37 | 37 | 37 | 37 |
| SI | 10 | 10 | 10 | 10 | 10 | 10 |
| WAX | 2 | 2 | 2 | 2 | 2 | 2 |
| RF1 | 3 | 3 | 0 | 0 | 0 | 0 |
| ZNO | 5 | 5 | 5 | 5 | 5 | 5 |
| FA | 0.5 | 0 | 0 | 0 | 0 | 0 |
| TR | 5.5 | 5 | 5 | 5 | 0 | 0 |
| OIL | 1 | 2 | 2 | 2 | .7 | 7 |
| | | | P | | | |
| NP2 | 164 | 164 | 164 | 166 | 164 | 166 |
| RF2 | 3 | 3 | 0 | 0 | 0 | 0 |
| AO | 1 | 1 | 1 | 1 | 1 | 1 |
| RT | 0.2 | 0.2 | 0.2 | 0.2 | 0.2 | 0.2 |
| ZNO | 3 | 3 | 3 | 3 | 3 | 3 |
| ACC | 1.1 | 1.1 | 1.1 | 1.1 | 1.1 | 1.1 |
| S | 2.9 | 2.9 | 2.9 | 2.9 | 2.9 | 2.9 |

Runs 1 and 2 are two controls which differ primarily in FA, TR and OIL levels. These controls were included as comparison runs for analyzing the usefulness of aluminum oxide as a fatty acid deactivator. After the formulations were mixed, each formulation was subjected to a series of tests to determine tack, cure properties and surface properties. The values obtained from these tests are shown in the following tables:

TABLE 6

| Run | TACK VALUES (N/CM)(a) | | |
|---|---|---|---|
| | Original | 1 Day(b) | 7 Days(c) |
| 1 | 16.2 ± 6.8 | 0.89 ± 0.65 | 5.12 ± 0.84 |
| 2 | 16.9 ± 4.1 | 2.66 ± 0.50 | 4.89 ± 0.43 |
| 3 | 26.7 ± 6.8 | 4.03 ± 1.43 | 3.74 ± 0.30 |
| 4 | 18.6 ± 8.4 | 4.34 ± 0.68 | 3.66 ± 0.17 |
| 5 | 24.5 ± 6.5 | 8.80 ± 2.48 | 5.41 ± 0.26 |
| 6 | 29.5 ± 8.5 | 8.08 ± 3.44 | 5.82 ± 0.09 |

(a)Tack testing was performed as taught in Magnus, F.L. and Hamed, G.R., Role of Phenolic Tackifiers in Polyisoprene Rubber, ACS Rubber Division, Spring 1989 Meeting, Mexico City, Paper No. 2.
(b)90% RH at 30° C.
(c)60% RH at 22° C.

TABLE 7

| SIZE OF FT-IR PEAKS IN 1540-1560 CM-1 RANGE* | | |
|---|---|---|
| Run # | 1 Day(a) | 7 Days(b) |
| 1 | 19.8 | 3.3 (1545) |
| 2 | 10.6 | 2.4 (1550) |
| 3 | 5.0 | 1.9 |
| 4 | 4.6 | 0.8 |
| 5 | 2.2 | 0.7 |
| 6 | 1.2 (1550) | 0.6 |

*Number in parenthesis is the peak wave number. If no wave number is listed, the peak is at 1540 cm-1 which represents fatty acid salt. FT-IR spectra were obtained using an attenuated total reflectance technique for measuring relative surface components as taught in Magnus, F.L. and Hamed, G.R., Role of Phenolic Tackifiers in Polyisoprene Rubber, ACS Rubber Division, Spring 1989 Meeting, Mexico City, Paper No. 2. The values stated are the relative peak size in absorbance units per cited reference.
(a)90% RH at 30° C.
(b)60% RH at 22° C.

TABLE 8

| | RHEOMETER CURE PROPERTIES @ 150° C. | | | | | |
|---|---|---|---|---|---|---|
| Compound Variable | ML (dN-m) | ts1 (min) | tc25 (min) | tc90 (min) | ΔT (dN-m) | Rate (dN-m/min) |
| 1 | 8.2 | 4.2 | 9.8 | 23.0 | 31.3 | 1.54 |
| 2 | 8.7 | 4.1 | 10.6 | 28.7 | 27.4 | 0.99 |
| 3 | 8.5 | 4.9 | 8.4 | 11.2 | 26.8 | 5.11 |
| 4 | 8.8 | 4.8 | 8.4 | 11.2 | 22.0 | 5.19 |
| 5 | 7.9 | 4.0 | 6.9 | 10.7 | 18.9 | 3.29 |
| 6 | 7.3 | 4.1 | 6.9 | 10.2 | 18.9 | 3.75 |

From the data in Table 6, it can be seen that ALO significantly improves original and one day 90% RH at 30° C. tack values. It is also apparent that ALO has little effect on seven day 90% RH at 22° C. tack values. The major difference between these compounds and those of Example 1 is that, except for the two controls, the compounds do not contain an RF resin system. The data in Table 7 also show a more significant reduction in fatty acid content at or near the compound surface. In the absence of an RF system, the cure properties of these compounds are different (see Table 8).

EXAMPLE 4

This example illustrates the effect that a series of aluminum oxides have on tack values, surface composition and cure properties of a set of compound formulations involving two non-productive mix stages and one production mix stage where component levels are in phr.

The compounds were mixed in a standard lab scale internal mixer. The compound formulations per mix were as follows:

| Component (phr) | 1 | 2 | 3 | 4 | 5 | 6 |
|---|---|---|---|---|---|---|
| NP1 | | | | | | |
| NR | 100 | 100 | 100 | 100 | 100 | 100 |
| ALO | 5 | 5 | 5 | 5 | 5 | 0 |
| NP2 | | | | | | |
| NP1 | 105 | 105 | 105 | 105 | 105 | 100 |
| CB | 45 | 45 | 45 | 45 | 45 | 45 |
| RF1 | 0.55 | 0.55 | 0.55 | 0.55 | 0.55 | 0.55 |
| OIL | 12 | 12 | 12 | 12 | 12 | 12 |
| P | | | | | | |
| NP2 | 162.55 | 162.55 | 162.55 | 162.55 | 162.55 | 157.55 |
| RF2 | 0.45 | 0.45 | 0.45 | 0.45 | 0.45 | 0.45 |
| AO | 0.60 | 0.60 | 0.60 | 0.60 | 0.60 | 0.60 |
| ZNO | 3 | 3 | 3 | 3 | 3 | 3 |
| ACC | 1.25 | 1.25 | 1.25 | 1.25 | 1.25 | 1.25 |
| S | 2.50 | 2.50 | 2.50 | 2.50 | 2.50 | 2.50 |

The runs used the following ALO:
1 - 5 phr $Al_2O_3$ (Whitaker, Clark and Daniels, 325 mesh)
2 - 5 phr $Al_2O_3$ (AlU chem. 325 mesh)
3 - 5 phr $Al_2O_3$ (Activated aluminum 325 mesh)
4 - 5 phr $Al_2O_3$ (Neutral) $Al_2O_3$
5 - 5 phr $Al_2O_3$ (Basic) $Al_2O_3$
6 - Control

TABLE 9

RHEOMETER CURE PROPERTIES AT 150° C.

| Run # | ΔT (dN-m) | ML (dN-m) | t(s)1 (min) | t(c)25 (min) | t(c)90 (min) | Rate (dN-m/min) |
|---|---|---|---|---|---|---|
| 1 | 28.7 | 8.0 | 2.5 | 3.0 | 6.6 | 5.49 |
| 2 | 31.5 | 8.5 | 2.3 | 2.8 | 6.1 | 6.46 |
| 3 | 29.8 | 8.5 | 2.3 | 2.8 | 5.4 | 2.71 |
| 4 | 38.9 | 8.1 | 2.4 | 2.9 | 5.7 | 7.03 |
| 5 | 27.8 | 8.4 | 2.4 | 2.9 | 5.6 | 6.98 |
| 6 | 30.1 | 9.0 | 2.4 | 2.9 | 6.4 | 5.86 |

TABLE 10

TACK VALUES (N/CM)(a)

| run | original | 1 Day(b) | 3 Days(c) | 2 Days(d) | 7 Days(e) |
|---|---|---|---|---|---|
| 1 | 26.0 ± 2.9 | 1.57 ± 0.37 | 1.22 ± 0.44 | 4.92 ± 0.37 | 2.43 ± 0.18 |
| 2 | 32.3 ± 9.1 | 1.41 ± 0.42 | 3.95 ± 1.75 | 5.06 ± 0.15 | 2.41 ± 0.27 |
| 3 | 26.0 ± 1.6 | 0.78 ± 0.36 | 1.82 ± 1.08 | 3.28 ± 0.41 | 1.62 ± 0.74 |
| 4 | 26.6 ± 1.7 | 4.81 ± 0.71 | 5.35 ± 0.19 | 3.32 ± 0.32 | 0.63 ± 0.23 |
| 5 | 27.9 ± 4.9 | 6.06 ± 0.53 | 4.52 ± 0.54 | 3.80 ± 0.26 | 0.54 ± 0.10 |
| 6 | 26.2 ± | 1.38 ± | 1.21 ± 0.18 | 6.21 ± 0.52 | 2.05 ± 0.38 |
| | 2.3 | 2.60 | | | |

(a)Tack testing was performed as taught in Magnus, F.L. and Hamed, G.R., Role of Phenolic Tackifiers in Polyisoprene Rubber, ACS Rubber Division, Spring 1989 Meeting, Mexico City, Paper No. 2.
(b)90% RH at 30° C.
(c)90% RH at 30° C.
(d)55% RH at 23° C.
(e)55% RH at 23° C.

It can be seen from Table 9 that the various ALO's do not affect cure properties to any great extent. The tack data of Table 10 are more problematic. The results do not show the significant results seen in Example 2.

While in accordance with the patent statutes, the best mode and preferred embodiment of the invention have been described, it is to be understood that the invention is not limited thereto, but rather is to be measured by the scope and spirit of the appended claims.

What is claimed is:

1. A process for deactivating fatty acids which are present in an uncured bulk elastomer prior to compounding in an amount sufficient to adversely affect tack and cure properties, wherein said elastomer is a sulfur vulcanizable diene-containing polymer or mixture thereof, said process comprising adding to said bulk elastomer a sulfur vulcanizing agent and an amount of metal oxide sufficient to deactivate said fatty acids, said metal oxide being selected from the group consisting of aluminum oxide and mixtures of calcium oxide and aluminum oxide, wherein said metal oxide is aluminum oxide from about 0.1 phr to about 7 phr or a mixture comprising from about 0.5 phr of aluminum oxide and from about 0.05 phr to about 1 phr of calcium oxide.

2. A process according to claim 1 wherein said bulk elastomer is natural rubber.

3. A process according to claim 1 wherein the quantity of fatty acid present in said bulk elastomer is undetermined at the time of addition of said metal oxide.

4. A process according to claim 1 wherein from about 2 to about 10 phr of zinc oxide is also added to said elastomer.

5. A process according to claim 1 wherein said metal oxide is aluminum oxide from about 0.1 phr to about 7 phr.

6. A process according to claim 1 wherein said metal oxide is a mixture comprising from about 0.5 phr to about 5 phr of aluminum oxide and from about 0.05 phr to about 1 phr of calcium oxide.

7. A fatty acid deactivated rubber composition prepared according to the process of claim 1.

8. A vulcanizate of a composition according to claim 7.

9. A tire containing, as a component, a vulcanizate as claimed in claim 8.

10. A tire according to claim 9 wherein the rubber of said vulcanizate is natural rubber.

11. A tire according to claim 9 wherein said vulcanizate further comprises from about 2 to about 10 phr of zinc oxide.

12. A rubber composition according to claim 7, wherein said metal oxide is aluminum oxide from about 0.1 phr to about 7 phr.

13. A rubber composition according to claim 7 wherein said metal oxide is a mixture comprising from about 0.5 phr to about 5 phr of aluminum oxide and from about 0.5 phr to about 1 phr calcium oxide.

14. A rubber according to claim 7 wherein said elastomer is natural rubber.

15. A composition according to claim 13, wherein said mixture comprises from about 1 phr to about 5 phr aluminum oxide and from about 0.1 phr to about 1 phr calcium oxide.

16. A process for deactivating fatty acids which are present in an uncured bulk elastomer prior to compounding in an amount sufficient to adversely affect tack and cure properties, wherein said elastomer is a sulfur vulcanizable diene-containing polymer or mixture thereof, which prior to compounding contains sufficient fatty acid to adversely affect tack and cure properties, said process comprising adding to said bulk elastomer a sulfur vulcanizing agent and an amount of metal oxide sufficient to deactivate said fatty acids, said metal oxide being selected from the group consisting of aluminum oxide, calcium oxide and mixtures thereof, the amount of said metal oxide being about 0.1 phr to about 5 phr of calcium oxide, about 0.1 phr to about 7 phr of aluminum oxide, or a mixture comprising from about 0.5 phr to about 5 phr of aluminum oxide and from about 0.05 phr to about 1 phr of calcium oxide, the amount of said metal oxide added being in excess of the stoichiometric quantity equivalent to any fatty acid added as a compounding ingredient.

17. A process according to claim 16 wherein said bulk elastomer is natural rubber.

18. A process according to claim 16 wherein the quantity of fatty acid present in said bulk elastomer is undetermined at the time of addition of said metal oxide.

19. A process according to claim 16 wherein from about 2 to about 10 phr of zinc oxide is also added to said elastomer.

20. A process according to claim 16 wherein said metal oxide is calcium oxide from about 0.1 phr to about 5 phr.

21. A process according to claim 20 wherein said calcium oxide is from about 0.1 phr to about 2 phr.

22. A tire containing, as a component, a vulcanizate of a composition prepared according to the process of claim 16.

* * * * *